(12) United States Patent
Takagi

(10) Patent No.: US 11,778,119 B2
(45) Date of Patent: Oct. 3, 2023

(54) INFORMATION PROCESSING APPARATUS PERFORMING SETTING OF APPLICATION IN CLIENT DEVICE, INFORMATION PROCESSING SYSTEM INCLUDING SAME, AND NON-TRANSITORY COMPUTER-READABLE RECORDING MEDIUM STORING SETTING TOOL PROGRAM

(71) Applicant: KYOCERA Document Solutions Inc., Osaka (JP)

(72) Inventor: Ryota Takagi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/718,177

(22) Filed: Apr. 11, 2022

(65) Prior Publication Data

US 2022/0345581 A1 Oct. 27, 2022

(30) Foreign Application Priority Data

Apr. 23, 2021 (JP) ................................ 2021-073338

(51) Int. Cl.
*H04N 1/00* (2006.01)

(52) U.S. Cl.
CPC ..... *H04N 1/00973* (2013.01); *H04N 1/00244* (2013.01); *H04N 1/00503* (2013.01); *H04N 1/00938* (2013.01); *H04N 2201/0094* (2013.01)

(58) Field of Classification Search
CPC ........... H04N 1/00244; H04N 1/00503; H04N 1/00938; H04N 1/00973; H04N 2201/0094; H04N 1/00933; G06F 3/0484; G06F 8/61; G06F 16/27; G06F 16/273; G06F 11/3438; G06F 16/8373; G06F 16/9024; G06Q 10/10; Y10S 707/99953; Y10S 707/99955; A63F 13/335; A63F 13/61; A63F 13/792; A63F 13/92; A63F 2300/402; A63F 2300/406; A63F 2300/5513; H04L 67/12; H04L 67/125; H04L 67/131;

(Continued)

(56) References Cited

U.S. PATENT DOCUMENTS

| 9,396,354 | B1 * | 7/2016 | Murphy | ............... H04L 51/212 |
| 10,169,596 | B2 * | 1/2019 | Fuse | .................... G06F 21/6209 |
| 10,609,185 | B2 * | 3/2020 | Bliss | .................... G06F 3/0481 |

(Continued)

FOREIGN PATENT DOCUMENTS

JP 2021005295 A 1/2021

*Primary Examiner* — Negussie Worku
(74) *Attorney, Agent, or Firm* — IP BUSINESS SOLUTIONS, LLC

(57) ABSTRACT

An information processing apparatus includes a control circuit configured to operate as a setting tool that performs setting of an application installed in a client device by executing a setting tool program. The setting tool includes an application setter and a server synchronizer. The application setter is configured to perform setting of an application in a client device. The server synchronizer is configured to synchronously register the client device on which setting has been performed by the application setter in a server apparatus that manages a client device which is provided with a function of the application with the setting performed on the client device by the application setter as a trigger.

10 Claims, 13 Drawing Sheets

(58) Field of Classification Search
CPC ..... H04L 67/306; H04L 67/535; H04L 67/56; H04M 1/72454; H04W 4/021; H04W 4/38
USPC ......................................................... 358/1.15
See application file for complete search history.

(56) References Cited

U.S. PATENT DOCUMENTS

| | | | |
|---|---|---|---|
| 11,526,307 B2* | 12/2022 | Chiba | G06F 3/1258 |
| 2004/0148525 A1* | 7/2004 | Aida | G06F 8/61 |
| | | | 726/28 |
| 2008/0114830 A1* | 5/2008 | Welingkar | H04L 67/34 |
| | | | 707/E17.032 |
| 2012/0084259 A1* | 4/2012 | Welingkar | G06F 21/88 |
| | | | 707/E17.007 |
| 2015/0189116 A1* | 7/2015 | Ito | H04N 1/00928 |
| | | | 358/1.13 |
| 2016/0028913 A1* | 1/2016 | Yoshida | H04N 1/00244 |
| | | | 358/1.15 |
| 2016/0277241 A1* | 9/2016 | Nakamori | G06F 16/27 |
| 2016/0285696 A1* | 9/2016 | Imai | H04L 41/0816 |
| 2017/0223209 A1* | 8/2017 | Nakamura | H04N 1/00931 |
| 2018/0267750 A1* | 9/2018 | Kobayashi | G06F 3/1205 |
| 2019/0349483 A1* | 11/2019 | Shibata | G06F 3/1288 |
| 2020/0412890 A1* | 12/2020 | Hirota | H04N 1/00509 |
| 2022/0174178 A1* | 6/2022 | Okamoto | H04N 1/00424 |
| 2022/0272209 A1* | 8/2022 | Yoneda | H04N 1/0097 |

* cited by examiner

Fig. 5

| DEVICE NAME | SERIAL NUMBER | IP ADDRESS ~413 | HOST NAME ~414 | LOCATION ~415 |
|---|---|---|---|---|
| A | A123B101 | | | |
| B | A123B102 | 10.183.82.107 | KAAC03F | |
| C | A123B103 | 10.183.82.108 | KAAC03G | |
| D | A123B104 | 10.183.82.109 | KAAC03H | |
| E | A123B105 | 10.183.82.110 | KAAC03I | |
| F | A123B106 | 10.183.82.111 | KAAC03J | |
| G | A123B107 | 10.183.82.112 | KAAC03K | |
| H | A123B108 | 10.183.82.113 | KAAC03L | |
| I | A123B109 | 10.183.82.114 | KAAC03M | |
| J | A123B110 | 10.183.82.115 | KAAC03N | |
| K | A123B111 | 10.183.82.116 | KAAC03O | |
| L | A123B112 | 10.183.82.117 | KAAC03P | |
| M | A123B113 | 10.183.82.118 | KAAC03Q | |
| N | A123B114 | 10.183.82.119 | KAAC03R | |
| | | 10.183.82.120 | KAAC03S | |

DISCOVER DEVICES · ASSIGN TO GROUP · DEVICE · REFRESH · COMMUNICATION SETTINGS · DEVICE ACTIONS

INFORMATION PROCESSING APPARATUS PERFORMING SETTING OF APPLICATION IN CLIENT DEVICE, INFORMATION PROCESSING SYSTEM INCLUDING SAME, AND NON-TRANSITORY COMPUTER-READABLE RECORDING MEDIUM STORING SETTING TOOL PROGRAM

INCORPORATION BY REFERENCE

This application claims priority to Japanese Patent Application No. 2021-073338 filed on Apr. 23, 2021, the entire contents of which are incorporated by reference herein.

BACKGROUND

The present disclosure relates to a setting tool program that performs setting of an application in a client device and an information processing apparatus and an information processing system that execute the setting tool program.

Setting of an application in a client device (for example, an image forming apparatus) in an office is often performed using a setting tool which is installed in an information processing apparatus (for example, a personal computer) used by a manager or the like in the office. For example, management of an installation status of an application in a client device, management of an application status of a layout of a graphical user interface of the application installed in the client device, and display of the layout according to a user may be performed using the setting tool.

SUMMARY

An aspect of the present disclosure provides an improvement in the aforementioned technique.

An information processing apparatus according to an aspect of the present disclosure includes an information processing apparatus including a control circuit configured to operate as a setting tool that performs setting of an application installed in a client device by executing a setting tool program. The setting tool includes an application setter and a server synchronizer. The application setter is configured to perform setting of an application in a client device. The server synchronizer is configured to synchronously register the client device on which setting has been performed by the application setter in a server apparatus that manages a client device which is provided with a function of the application with the setting performed on the client device by the application setter as a trigger.

An information processing system according to another aspect of the present disclosure includes an information processing apparatus and a server apparatus. The information processing apparatus includes the control circuit configured to operate as the setting tool. The setting tool includes the application setter and the server synchronizer.

A recording medium according to another aspect of the present disclosure is a non-transitory computer-readable recording medium storing a setting tool program. The setting tool program causes a control circuit of an information processing apparatus to operate as a setting tool. The setting tool operates as an application setter and a server synchronizer. The application setter is configured to perform setting of an application in a client device. The server synchronizer is configured to synchronously register the client device on which setting has been performed by the application setter in a server apparatus that manages a client device which is provided with a function of the application with the setting performed on the client device by the application setter as a trigger.

BRIEF DESCRIPTION OF THE DRAWINGS

FIG. 5 is a diagram illustrating an example of an application setting GUI.

DETAILED DESCRIPTION

Hereinafter, an information processing apparatus, an information processing system, and a non-transitory computer-readable recording medium storing a setting tool program according to an embodiment which is an aspect of the present disclosure will be described with reference to the accompanying drawings.

1. Information Processing System

Figure 1:
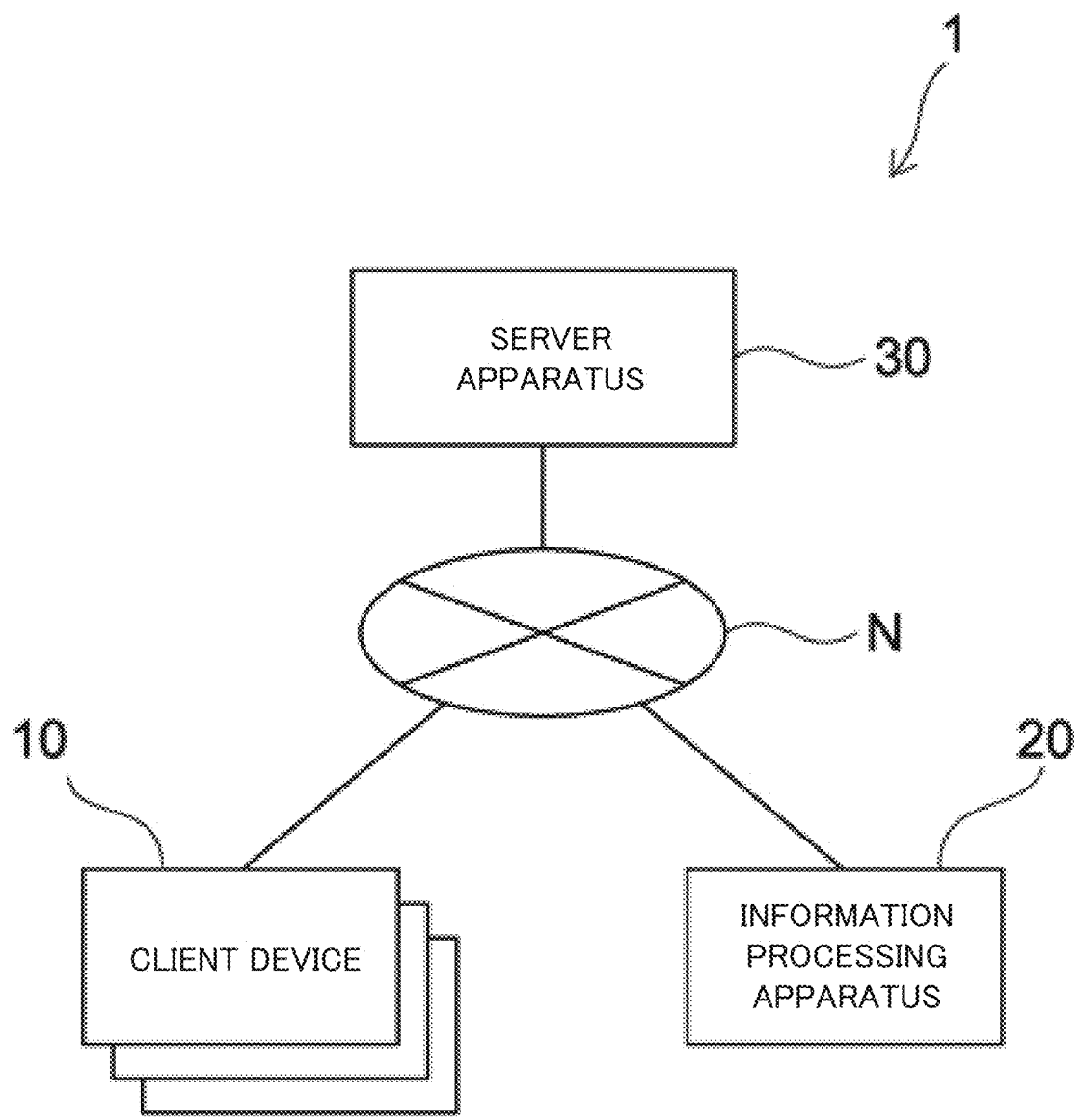
FIG. 1 is a diagram illustrating an information processing system according to an embodiment of the present disclosure.

FIG. 1 illustrates an information processing system according to an embodiment of the present disclosure.

The information processing system 1 includes a client device 10, an information processing apparatus 20, and a server apparatus 30. The client device 10 and the information processing apparatus 20 are communicatively connected via a network N such as a LAN. Via a network N such as the Internet, the server apparatus 30 and the information processing apparatus 20 are communicatively connected, and the server apparatus 30 and the client device 10 are communicatively connected.

The client device 10 is, for example, an image forming apparatus such as a multifunction peripheral (MFP). The number of client devices 10 may be one or two or more, and one client device 10 is illustrated and described unless otherwise mentioned. An application 110 can be installed in the client device 10. The application 110 is, for example, a platform application (for example, an APPLICATION) for executing a web application which is provided to the client device 10 via the network N. The application 110 may be installed already or not installed yet in the client device 10.

The information processing apparatus 20 is a personal computer which is used by a manager in an office (hereinafter simply referred to as a user) in which the client device 10 is installed. A setting tool program is installed in the information processing apparatus 20. The information processing apparatus 20 operates as a setting tool 210 by executing the setting tool program. The setting tool 210 is a user interface used to perform various settings of the application 110 installed in the client device 10. The setting tool 210 is also referred to as a configuration tool. The user performs various settings on an application in the client device 10 (for example, registration of the client device 10 in the setting tool 210, installation of the application 110, and installation of a layout of a graphical user interface) using the user interface of the setting tool 210.

The server apparatus 30 registers the client device 10 which is provided with a function of the application 110. The function of the application 110 is, for example, a function that is realized by a web application operating in the application 110 which is a platform application. The server apparatus 30 is a web server that provides the function of the application 110 to the client device 10 registered in the server apparatus 30. For example, when the application 110 is a platform application (such as an APPLICATION) for an image forming apparatus (the client device 10), a work flow (scanning data, copying scanned data to a folder, and ending) function may be provided as some functions of the application 110, and providing some functions is also defined as providing the function of the application 110. By installing the application 110 in the client device 10, the function of the application 110 is provided to the client device 10.

2. Functional Configuration of Information Processing System

Figure 2:
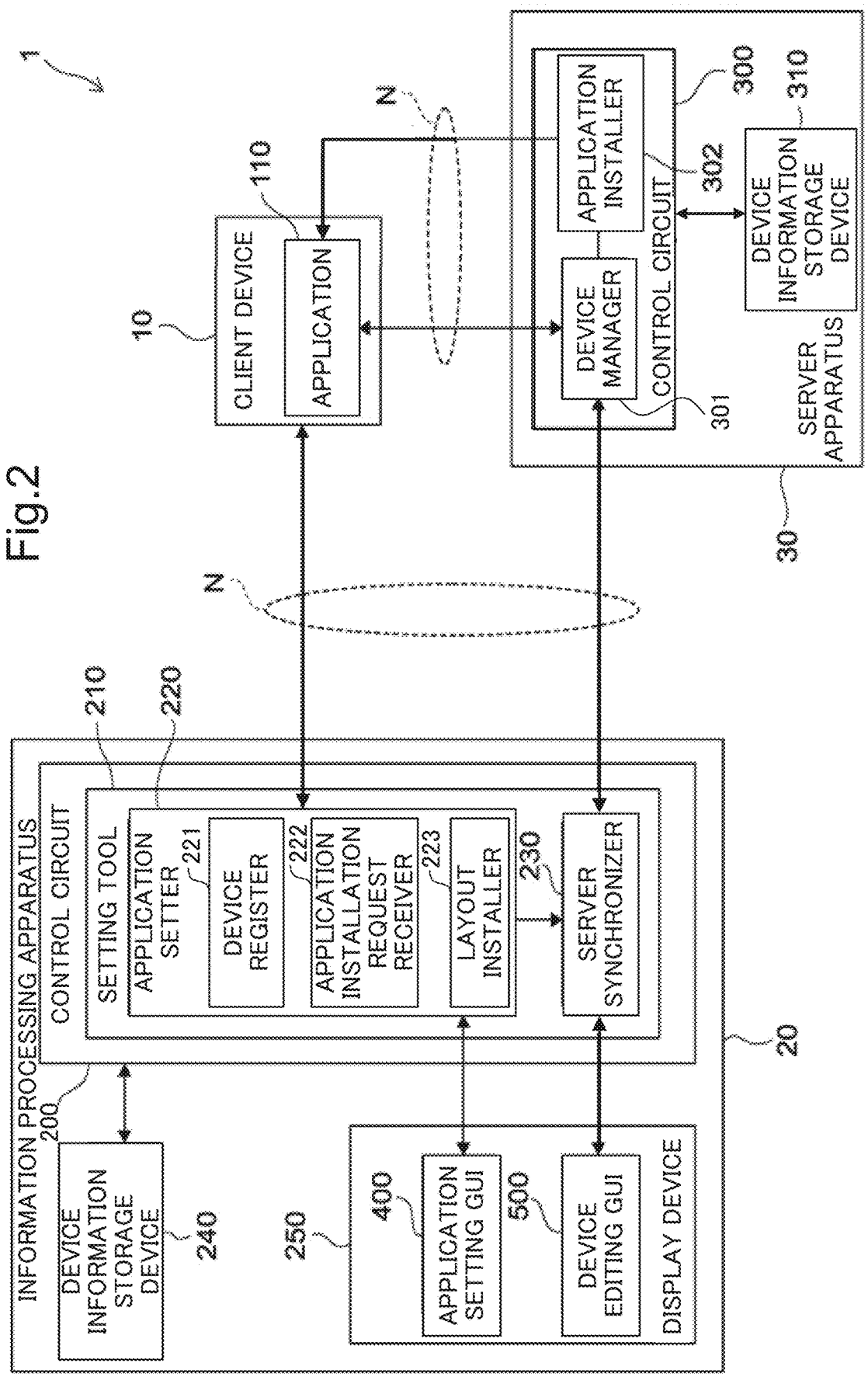
FIG. 2 is a diagram illustrating a functional configuration of the information processing system.

FIG. 2 illustrates a functional configuration of the information processing system.

A control circuit 200 of the information processing apparatus 20 operates as the setting tool 210 by causing a processor such as a CPU to load a setting tool program stored in a ROM to a RAM and to execute the loaded program. The setting tool 210 includes an application setter 220 and a server synchronizer 230. The application setter 220 includes a device register 221, an application installation request receiver 222, and a layout installer 223.

The application setter 220 performs various settings of the application 110 in the client device 10. Examples of the various settings include newly registering the client device 10 in the setting tool 210 by the device register 221, receiving a request for installing the application 110 in the client device 10 by the application installation request receiver 222, and receiving a request for installing a layout of a graphical user interface of the application 110 in the client device 10 by the layout installer 223.

The server synchronizer 230 synchronously registers the client device 10 in the server apparatus 30 with various settings for the client device 10 (that is, newly registering the client device 10 in the setting tool 210, receiving a request for installing the application 110 in the client device 10, and receiving a request for installing a layout of the graphical user interface of the application 110 in the client device 10) with the application setter 220 as a trigger.

The control circuit 300 of the server apparatus 30 operates a device manager 301 and an application installer 302 by causing the process such as a CPU to load an information processing program stored in the ROM to the RAM and to execute the loaded program.

3. Operation Flow of Information Processing System

An operation flow of the information processing system 1 will be described in the following order: (1) a case in which the client device 10 is newly registered in the setting tool and the number of licenses has not reached an upper limit (there is a spare license); (2) a case in which the client device 10 is newly registered in the setting tool and the number of licenses has reached the upper limit (there are no spare licenses); (3) a case in which the application 110 is installed in the client device 10; and (4) a case in which a layout of a graphical user interface of the application 110 is installed in the client device 10.

(1) Case in which the Client Device 10 is Newly Registered in the Setting Tool and the Number of Licenses has not Reached an Upper Limit (there is a Spare License)

Figure 3:
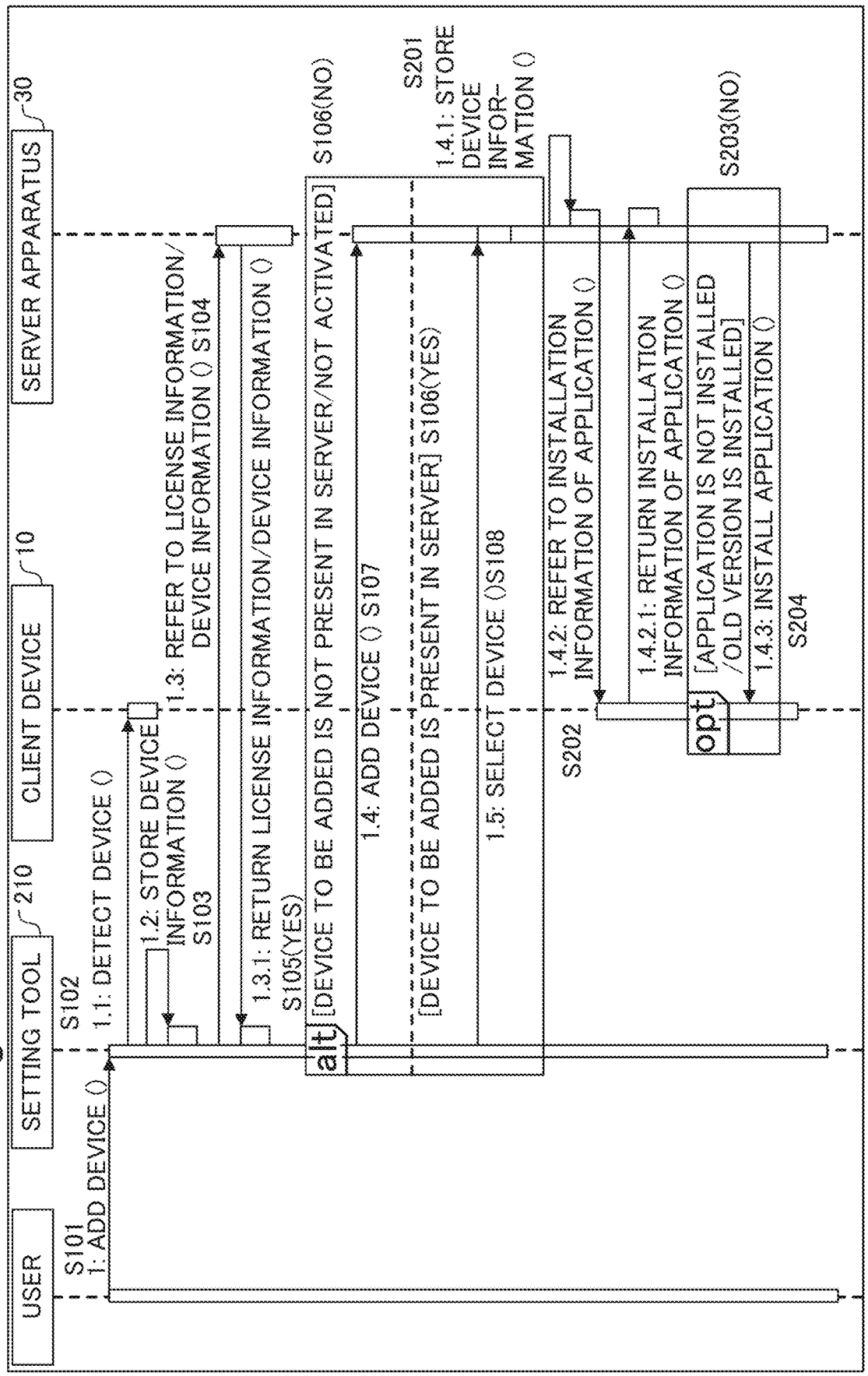
FIG. 3 is a diagram illustrating a first operation sequence of the information processing system.
Figure 4:
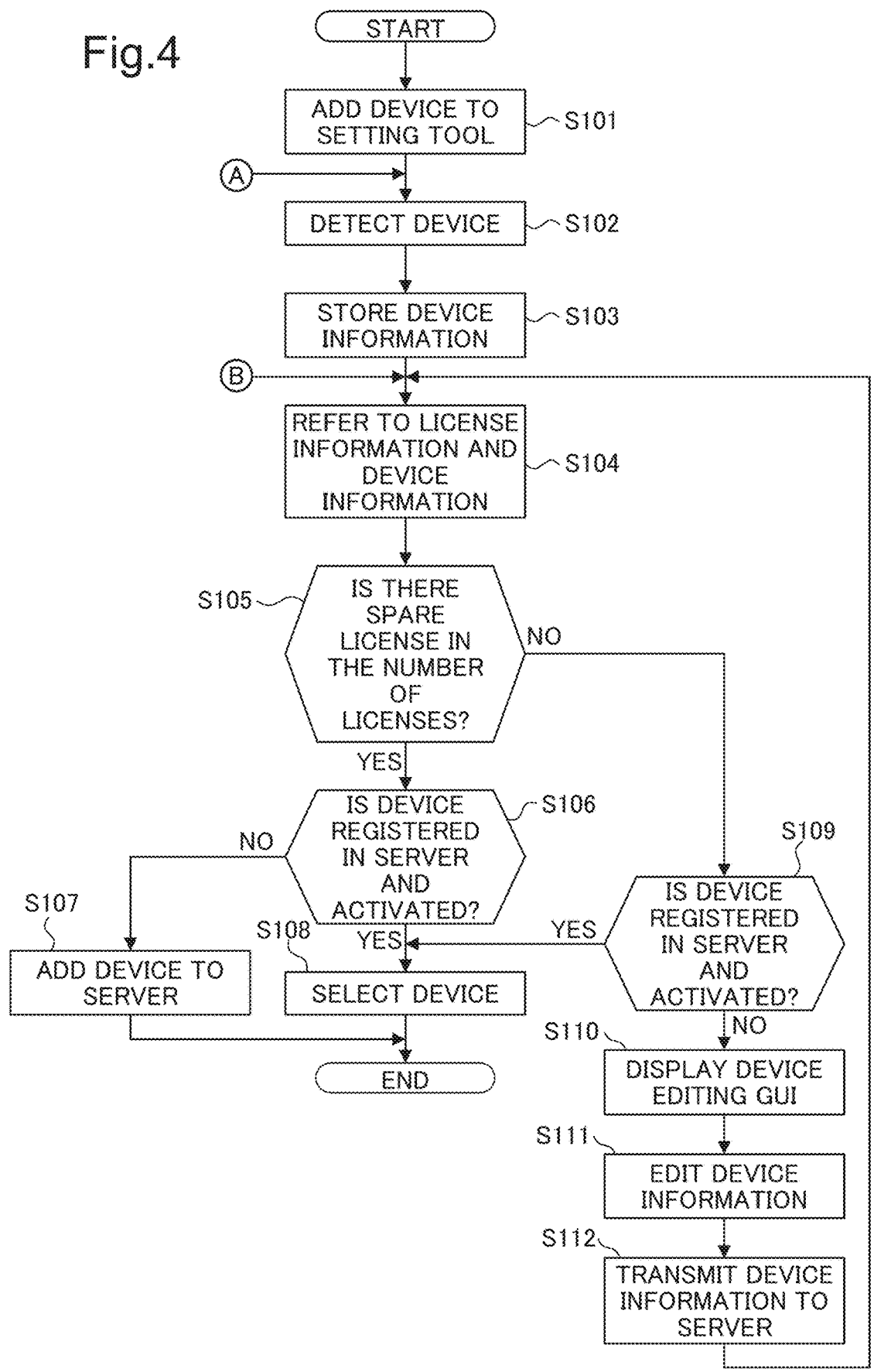
FIG. 4 is a diagram illustrating a first operation flow of a setting tool.

FIG. 3 illustrates a first operation sequence of the information processing system. FIG. 4 illustrates a first operation flow of the setting tool.

As the premise of the operation flow, the information processing apparatus 20 is operating the setting tool 210 by executing a setting tool program. The application setter 220 of the setting tool 210 displays an application setting GUI 400 on a display device 250 (display) of the information processing apparatus 20. The application setting GUI 400 is a graphical user interface used to perform various settings of the application 110 in the client device 10.

FIG. 5 illustrates an example of an application setting GUI.

The application setting GUI 400 includes a device list 410. The device list 410 is a device information list of a plurality of client devices 10 which is connected to the information processing apparatus 20 via a network N such as a LAN and registered in the setting tool 210. The device information includes, for example, a model name 411, a serial number 412, an IP address 413, a host name 414, and a location 415.

A user operates a discover-device icon 401 of the application setting GUI 400 to register a new client device 10 in the setting tool 210.

When an operation on the discover-device icon 401 is detected (Step S101), the device register 221 of the application setter 220 of the setting tool 210 detects a client device 10 connected to the information processing apparatus 20 via the network N such as a LAN (Step S102). The device register 221 stores device information of the detected client device 10 in a device information storage device 240 set in a nonvolatile storage device (such as an HDD or an SSD) of the information processing apparatus 20. Accordingly, the device register 221 registers the client device 10 in the setting tool 210 (Step S103).

Thereafter, the user operates a refresh icon 402 of the application setting GUI 400. Then, the device information of the newly detected client device 10 is added to the device list 410 of the application setting GUI 400. In other words, the device list 410 of the application setting GUI 400 is updated.

The server synchronizer 230 of the setting tool 210 synchronously registers the client device 10 added to the setting tool 210 in the server apparatus 30 with addition of the client device 10 to the setting tool 210 by the device register 221 of the application setter 220 as a trigger. Specific details are as follows.

The server synchronizer 230 of the setting tool 210 refers to license information of the client device 10 provided with the function of the application 110 (the function provided by the server apparatus 30) in the server apparatus 30 and device information registered in the server apparatus 30 (Step S104).

The license information includes an upper limit of the number of licenses and a current number of activated devices. The upper limit of the number of licenses is an upper limit of the number of client devices 10 provided with a function from the server apparatus 30, and the number is assumed to be contractually determined for each client who introduces the client device 10. Activation means that a client device 10 registered in the server apparatus 30 is activated to be able to perform the function provided from the server apparatus 30. The current number of activated devices is the number of client devices 10 which are currently activated and is also the current number of licenses. The license information is stored in the device manager 301.

The device information registered in the server apparatus 30 is device information for identifying a client device 10 provided with the function from the server apparatus 30. The device information includes activation information in addition to a model name, a serial number, an IP address, a host name, and a location. The activation information indicates whether a client device 10 is activated.

The server synchronizer 230 of the setting tool 210 determines whether the number of licenses has reached the upper limit based on the upper limit of the number of licenses and the current number of activated devices included in the license information stored and managed by the device manager 301 of the server apparatus 30 (Step S105). When the server synchronizer 230 determines that the current number of activated devices is equal to or greater than the upper limit of the number of licenses (NO in Step S105), this means that the number of licenses has reached the upper limit and there are no spare licenses in the number of licenses. On the other hand, when the server synchronizer 230 determines that the current number of activated devices is less than the upper limit of the number of licenses (YES in Step S105), this means that the number of licenses has not reached the upper limit and there is a spare license in the number of licenses.

When the determination result of Step S105 is YES, the server synchronizer 230 of the setting tool 210 determines whether the client device 10 registered in the setting tool 210 (Step S103) is registered in the server apparatus 30 and activated is determined (Step S106). Specifically, when the device information of the client device 10 registered in the setting tool 210 (Step S103) is included in the device information referred to by the server apparatus 30 (Step S104), the server synchronizer 230 determines that the client device 10 is registered in the server apparatus 30. The server synchronizer 230 determines whether the client device 10 is activated with reference to the device information of the client device 10 referred to by the server apparatus 30 (Step S104).

When the device information of the client device 10 registered in the setting tool 210 (Step S103) is not included in the device information referred to by the server apparatus 30 (Step S104), the server synchronizer 230 determines that the client device 10 is not registered in the server apparatus 30.

The case in which the number of licenses has not reached the upper limit, there is a spare license in the number of licenses (YES in Step S105), and the client device 10 is not registered in the server apparatus 30 or not activated (NO in Step S106) will be described below. In this case, the server synchronizer 230 of the setting tool 210 synchronously registers the client device 10 in the server apparatus 30 by adding the client device 10 to the server apparatus 30 (Step S107). Specifically, the server synchronizer 230 of the setting tool 210 transmits the device information of the client device 10 to the server apparatus 30 such that the device information of the client device 10 is stored therein.

The case in which the number of licenses has not reached the upper limit, there is a spare license in the number of licenses (YES in Step S105), and the client device 10 is registered in the server apparatus 30 and activated (YES in Step S106) will be described below. In this case, the server synchronizer 230 of the setting tool 210 additionally synchronously registers the client device 10 on which setting has been performed by the application setter 220 as a selected client device 10 by selecting a client device 10 to be currently registered (that is, a client device 10 registered in the setting tool 210 (Step S103)) out of the client devices 10 registered in the server apparatus 30 (Step S108). Specifically, the server synchronizer 230 of the setting tool 210 selects the client device 10, transmits newest device information of the client device 10 to the server apparatus 30, and additionally stores the newest device information of the client device 10 in the server apparatus 30.

Figure 6:
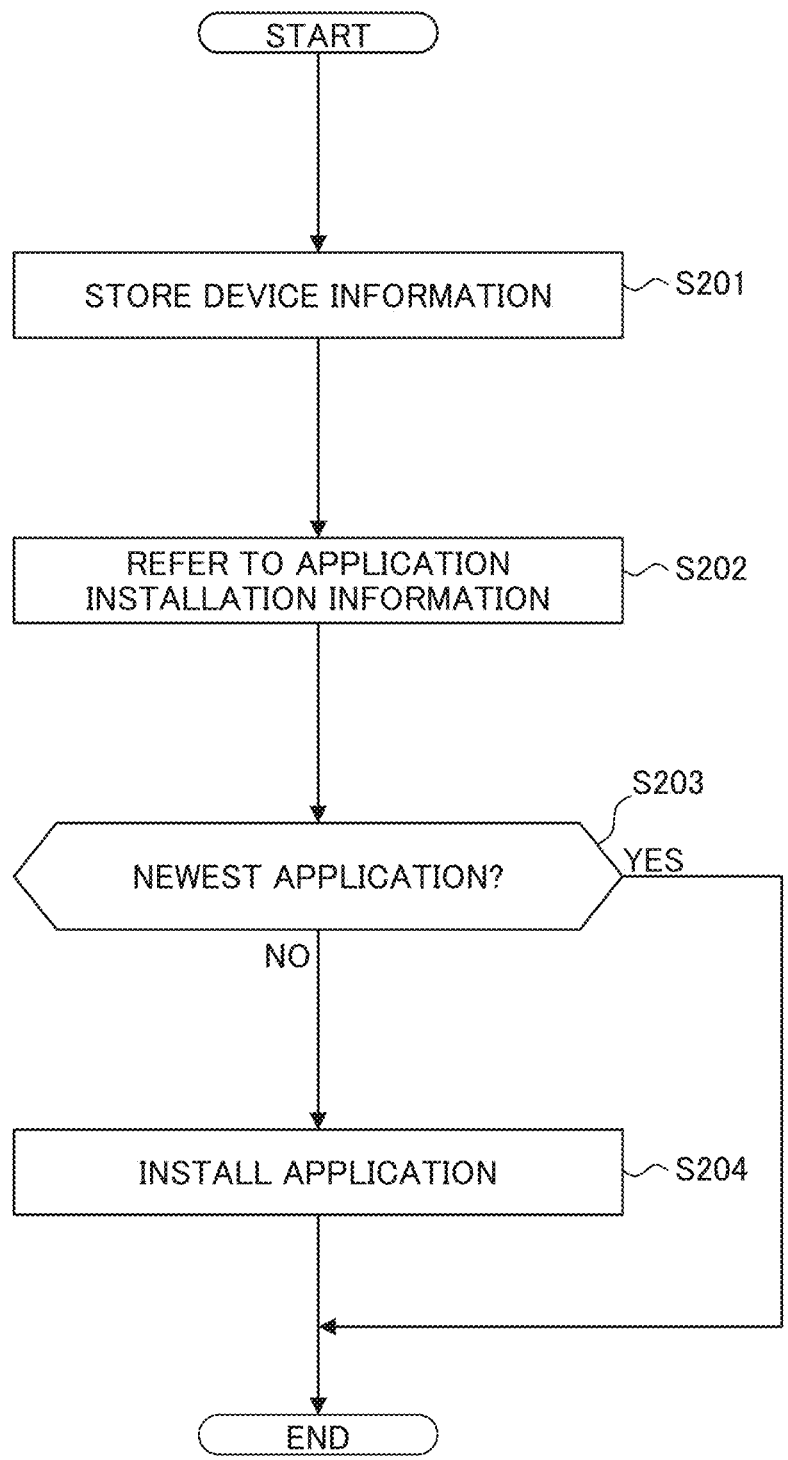
FIG. 6 is a diagram illustrating an operation flow of a server apparatus.

FIG. 6 illustrates an operation flow of the server apparatus.

The device manager 301 of the server apparatus 30 receives device information transmitted from the setting tool 210 (Step S107 or S108). The device manager 301 stores the received device information of the client device 10 in a device information storage device 310 set in a nonvolatile storage device (such as an HDD or an SSD) of the server apparatus 30. Accordingly, the device manager 301 registers the client device 10 in the server apparatus 30 (Step S201).

The device manager 301 of the server apparatus 30 accesses the client device 10 based on the IP address of the device information of the client device 10 synchronously registered in the server apparatus 30. The device manager 301 refers to installation information of the application 110 in the client device 10 (Step S202). The installation information includes information indicating whether the application 110 has been installed and version information or the like of the application 110 when the application 110 has been installed.

The device manager 301 of the server apparatus 30 determines whether the application 110 of a newest version has been installed in the client device 10 synchronously registered in the server apparatus 30 (Step S203). When the application 110 of a newest version has been installed in the client device 10, the device manager 301 ends the operation flow (YES in Step S203).

On the other hand, when the application 110 of a newest version has not been installed in the client device 10 synchronously registered in the server apparatus 30 (NO instep S203), the device manager 301 installs the application 110 of a newest version in the synchronously registered client device 10 (Step S204).

When the device manager 301 of the server apparatus 30 determines that the application 110 has been installed in the client device 10 and the version of the installed application 110 is an old version (NO in Step S203), the application installer 302 of the server apparatus 30 installs the application 110 of a newest version in the synchronously registered client device 10 (Step S204).

(2) Case in which a Client Device 10 is Newly Registered in the Setting Tool and the Number of Licenses has Reached the Upper Limit (there are no Spare Licenses in the Number of Licenses)

Figure 7:
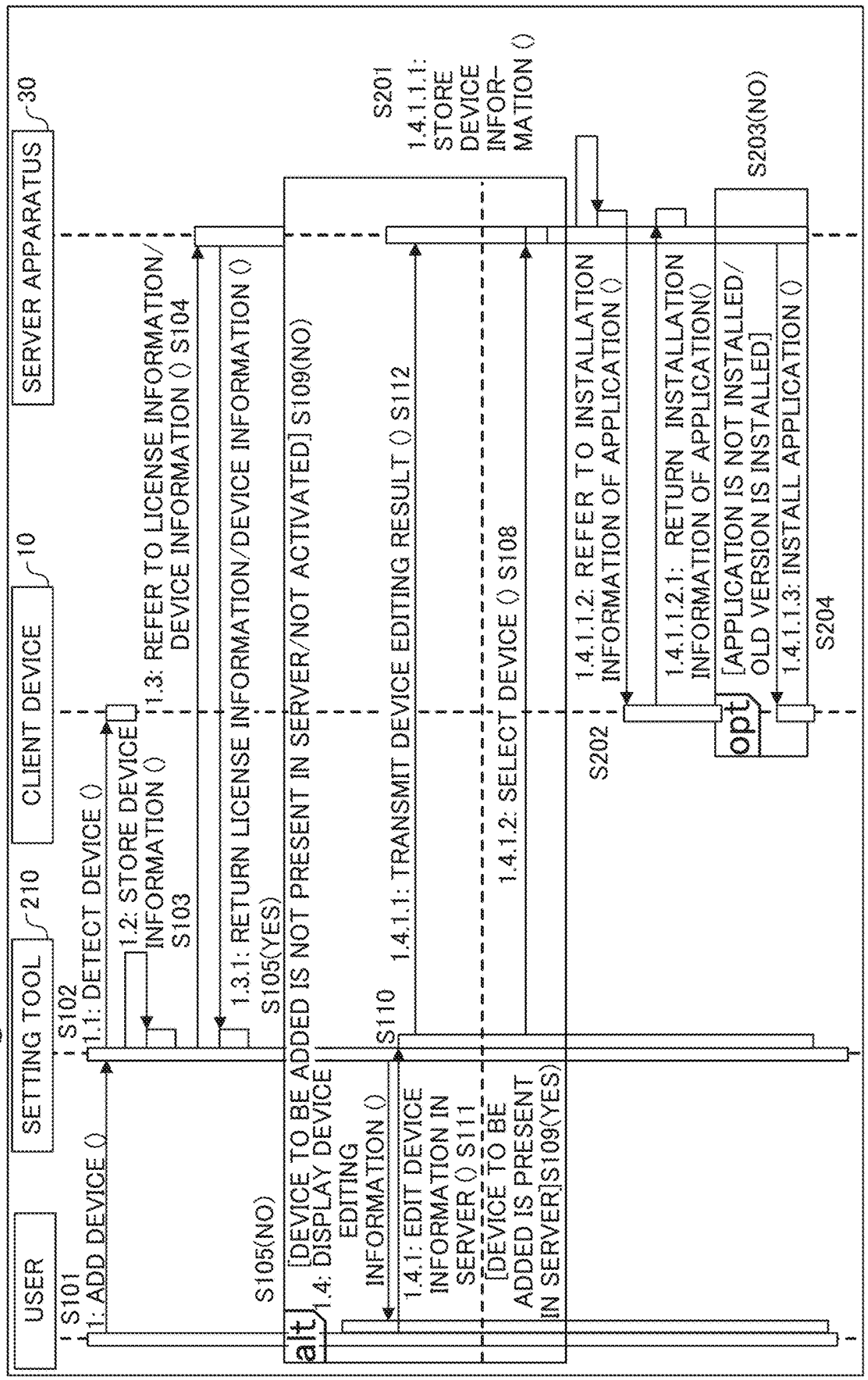
FIG. 7 is a diagram illustrating a second operation sequence of the information processing system.

FIG. 7 illustrates a second operation sequence of the information processing system. FIG. 4 is continuously referred to for the operation flow of the information processing apparatus.

The operations of Steps S101 to S105 are the same as the operations of Steps S101 to S105 described above with reference to FIGS. 3 and 4. Accordingly, operations of Step S105 and steps subsequent thereto will be described below.

A case in which the number of licenses has reached the upper limit, there are no spare licenses in the number of licenses (NO in Step S105), and the client device 10 is not registered in the server apparatus 30 or not activated (NO in Step S109) will be described below. In this case, the client device 10 can be activated by reducing the number of activated devices (that is, the number of licenses) to form a spare license in the number of licenses. That is, the device manager 301 stores the number of activated devices stored in the device information storage device 310 as the number of licenses.

Therefore, the server synchronizer 230 of the setting tool 210 displays a device editing GUI 500 on the display device 250 (display) of the information processing apparatus 20 (Step S110). The device editing GUI 500 is a graphical user interface for editing device information of client devices 10 registered in the server apparatus 30 and activated.

Figure 8:
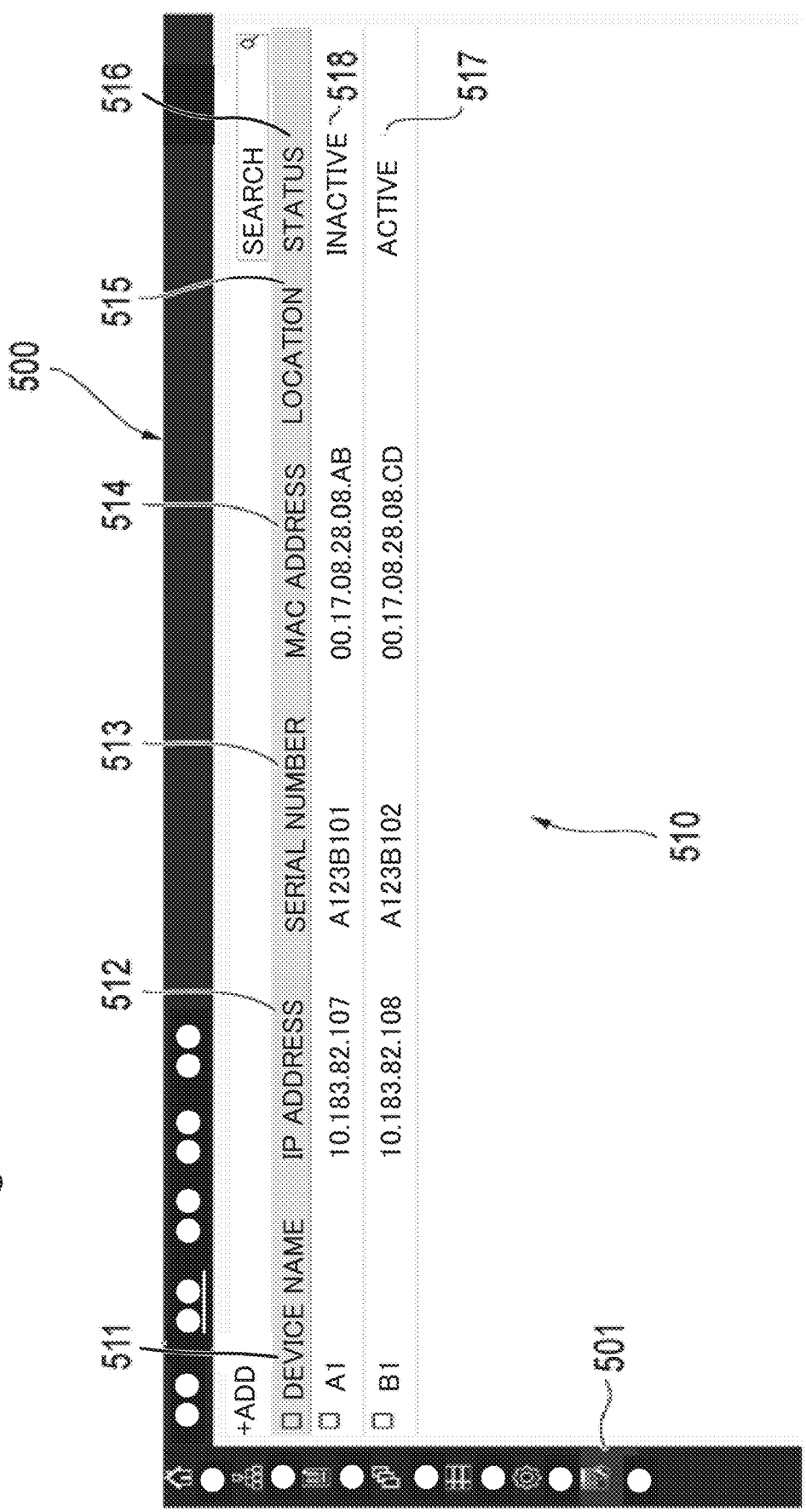
FIG. 8 is a diagram illustrating an example of a device editing GUI.

FIG. 8 illustrates an example of the device editing GUI.

The device editing GUI 500 includes a license icon 501. When a user operates the license icon 501, a device list 510 is displayed. The device list 510 is a device information list of a plurality of client devices 10 registered in the device manager 301 of the server apparatus 30. The device information includes, for example, a model name 511, an IP address 512, a serial number 513, a MAC address 514, a location 515, and a status 516. The status 516 is one of an active status 517 and an inactive status 518. The active status 517 means that the client device 10 is activated to be able to perform the function provided by the server apparatus 30. The inactive status 518 means that the client device 10 is not activated to be able to perform the function provided by the server apparatus 30. The device list 510 is also stored in the server synchronizer 230 of the setting tool 210.

For example, by allowing a user to input an editing instruction by operating a touch panel of the display device 250 of the information processing apparatus 20, the server synchronizer 230 edits the status 516 which is one active status 517 displayed on the device editing GUI 500 and changes the status 516 to the inactive status 518 in accordance with the editing instruction. Alternatively, by allowing a user to input a deletion instruction to delete the device information of one client device displayed on the device editing GUI 500 by operating the touch panel, the device manager 301 deletes registration of the client device 10 in the server apparatus 30 through access of the server synchronizer 230 in accordance with the deletion instruction. Accordingly, since the number of activated devices (that is, the number of licenses) is reduced, a spare license is generated in the number of licenses and it is possible to active the client device 10 currently registered in the server apparatus 30.

The server synchronizer 230 of the setting tool 210 edits the device information of the client device 10 registered in the server apparatus 30 and activated, which is stored therein, via the device editing GUI 500 such that it is inactive (Step S111). The server synchronizer 230 transmits the edited device information to the server apparatus 30 (Step S112).

The device manager 301 of the server apparatus 30 receives the edited device information transmitted from the setting tool 210 (Step S112). The device manager 301 stores (updates) the received edited device information in the device information storage device 310 set in the nonvolatile storage device (such as an HDD or an SSD) of the server apparatus 30.

As a result, since the number of licenses does not reach the upper limit and there is a spare license in the number of licenses (YES in Step S105), the server synchronizer 230 of the setting tool 210 can synchronously register the client device 10 in the server apparatus 30 (Step S107).

On the other hand, the case in which the number of licenses has reached the upper limit, there are no spare licenses in the number of licenses (NO in Step S105), and the client device 10 is registered in the server apparatus 30 and activated (YES in Step S109) will be described below. In this case, the server synchronizer 230 of the setting tool 210 additionally synchronously registers the client device 10 set by the application setter 220 as a selected client device 10 in the server apparatus 30 by selecting the client device 10 to be currently registered (that is, the client device 10 registered in the setting tool 210 (Step S103)) out of the client devices 10 registered in the server apparatus 30 (Step S108). In brief, when the client device 10 is registered in the server apparatus 30 and activated (YES in Step S106 or S109), the server synchronizer 230 selects the client device 10 to be currently registered out of the client devices 10 registered in the server apparatus 30 (Step S108) regardless of whether the number of licenses has reached the upper limit (Step S105).

Operations of Step S201 and steps subsequent thereto are the same as the operations of Step S201 and steps subsequent thereto described above with reference to FIGS. 3 and 6.

(3) Case in which the Application 110 is Installed in a Client Device 10

Figure 9:
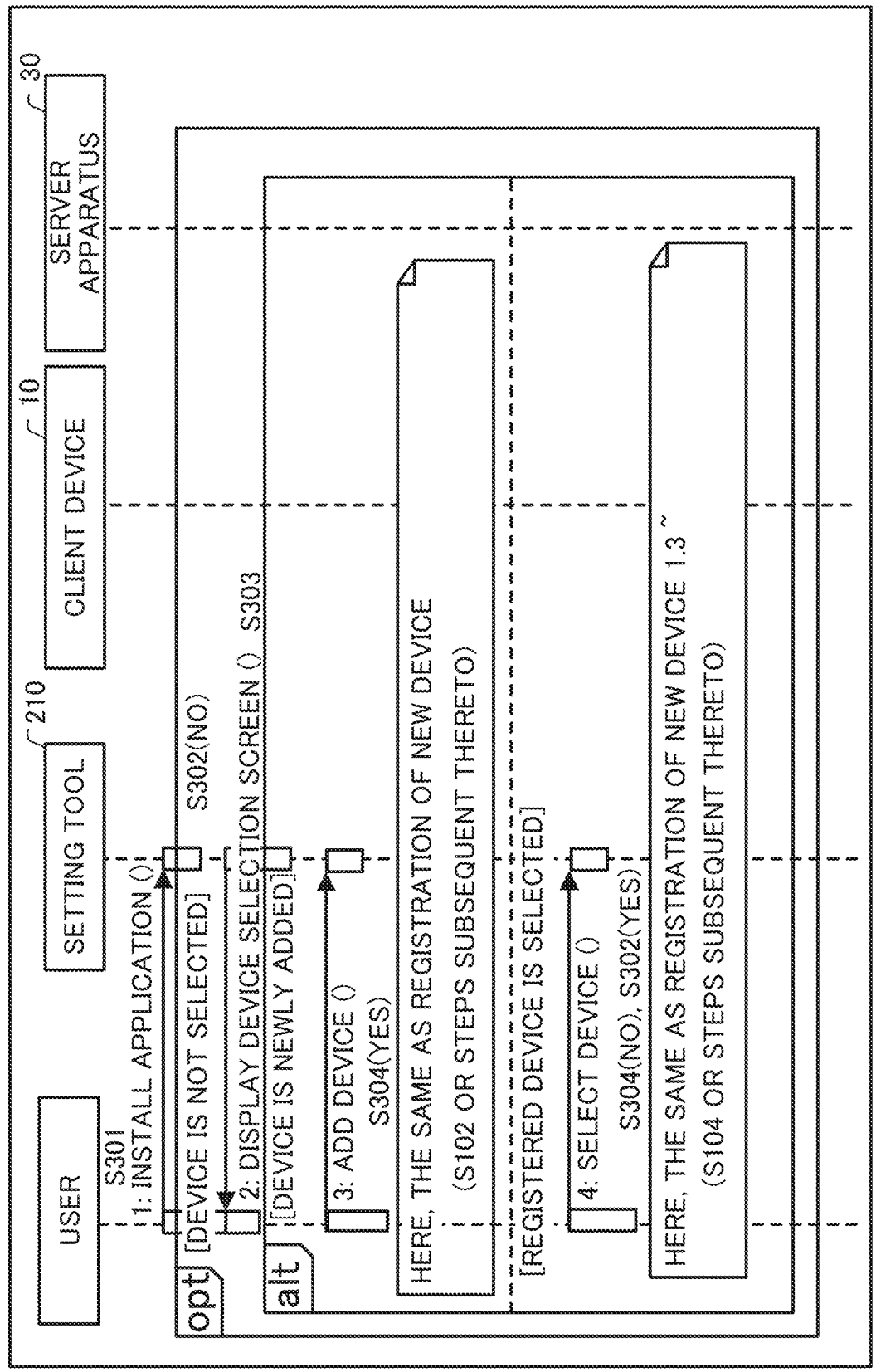
FIG. 9 is a diagram illustrating a third operation sequence of the information processing system.
Figure 10:
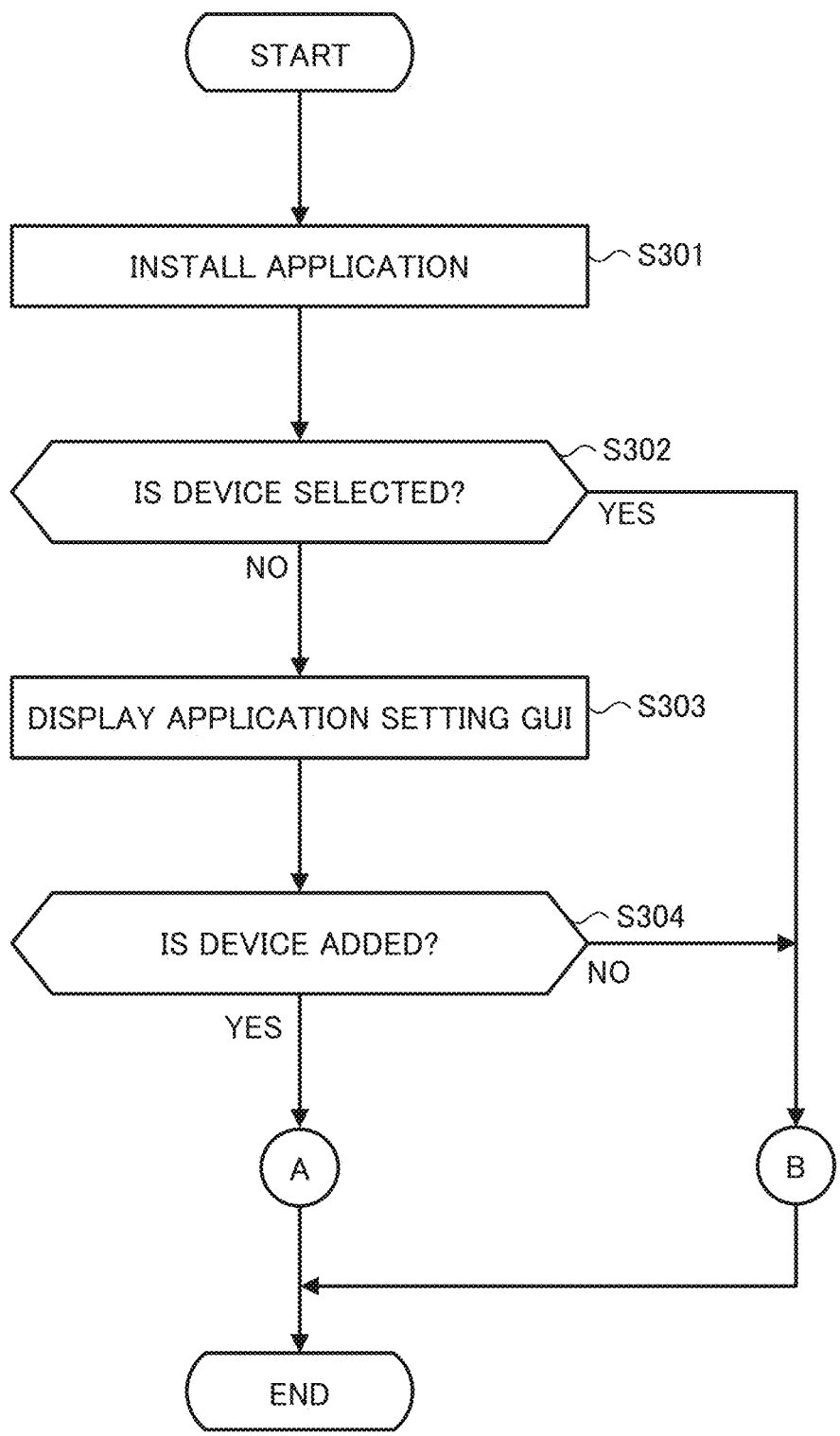
FIG. 10 is a diagram illustrating a second operation flow of the setting tool.

FIG. 9 illustrates a third operation sequence of the information processing system. FIG. 10 illustrates a second operation flow of the setting tool.

In order to install the application 110 in the client device 10, a user operates a GUI (for example, the application setting GUI 400 or another GUI) displayed on the display device 250 (display) of the information processing apparatus 20 and inputs a request for installing the application 110 in the client device 10. When a request for installing the application 110 in the client device 10 is received (Step S301), the application installation request receiver 222 of the application setter 220 of the setting tool 210 determines whether the client device 10 in which the application 110 is to be installed has been selected (Step S302).

When the client device 10 in which the application 110 is to be installed has not been selected on the application setting GUI 400 (NO in Step S302), the application installation request receiver 222 displays the application setting GUI 400 on the display device 250 (display) of the information processing apparatus 20 to add (YES in Step S304) or select (NO in Step S304) the client device 10 (Step S303).

Here, it is assumed that a user wants to install the application 110 in a new client device 10 which is not displayed in the device list 410 of the application setting GUI 400 (that is, not registered in the setting tool 210). In this case, the user operates the discover-device icon 401 of the application setting GUI 400 to register the new client device 10 in the setting tool 210.

When the operation of the discover-device icon 401 is detected (YES in Step S304), the device register 221 of the application setter 220 of the setting tool 210 performs operations of Step S102 and steps subsequent thereto. As a result, the new client device 10 is registered in the server apparatus 30 (Step S107 or Step S108), and the server apparatus 30 installs the application 110 in the client device 10 (Step S204).

On the other hand, it is assumed that the user wants to install the application 110 in the client device 10 displayed in the device list 410 of the application setting GUI 400 (that is, registered in the setting tool 210). In this case, the user selects the client device 10 in which the application 110 is to be installed on the application setting GUI 400 by operating a check box 419 of the application setting GUI 400 (NO in Step S304). Alternatively, when the client device 10 in which the application 110 is to be installed has been selected (YES in Step S302) at a time point at which the user has input the operation for installing the application 110 in the client device 10 (Step S301), the client device 10 in which the application 110 is to be installed is registered in the setting tool 210.

In this case, the server synchronizer 230 of the setting tool 210 starts an operation for synchronously registering the client device 10 in the server apparatus 30 (after Step S104). As a result, the new client device 10 is registered in the server apparatus 30 (Step S107 or S108). Then, the server apparatus 30 installs the application 110 in the client device 10 (Step S204).

In this way, the setting tool 210 synchronously registers the client device 10 in which the application 110 is newly installed in the server apparatus 30 with reception of a request for newly installing the application 110 in the client device 10 as a trigger.

(4) Case in which a Layout of a Graphical User Interface of an Application 110 is Installed in a Client Device 10

Figure 11:
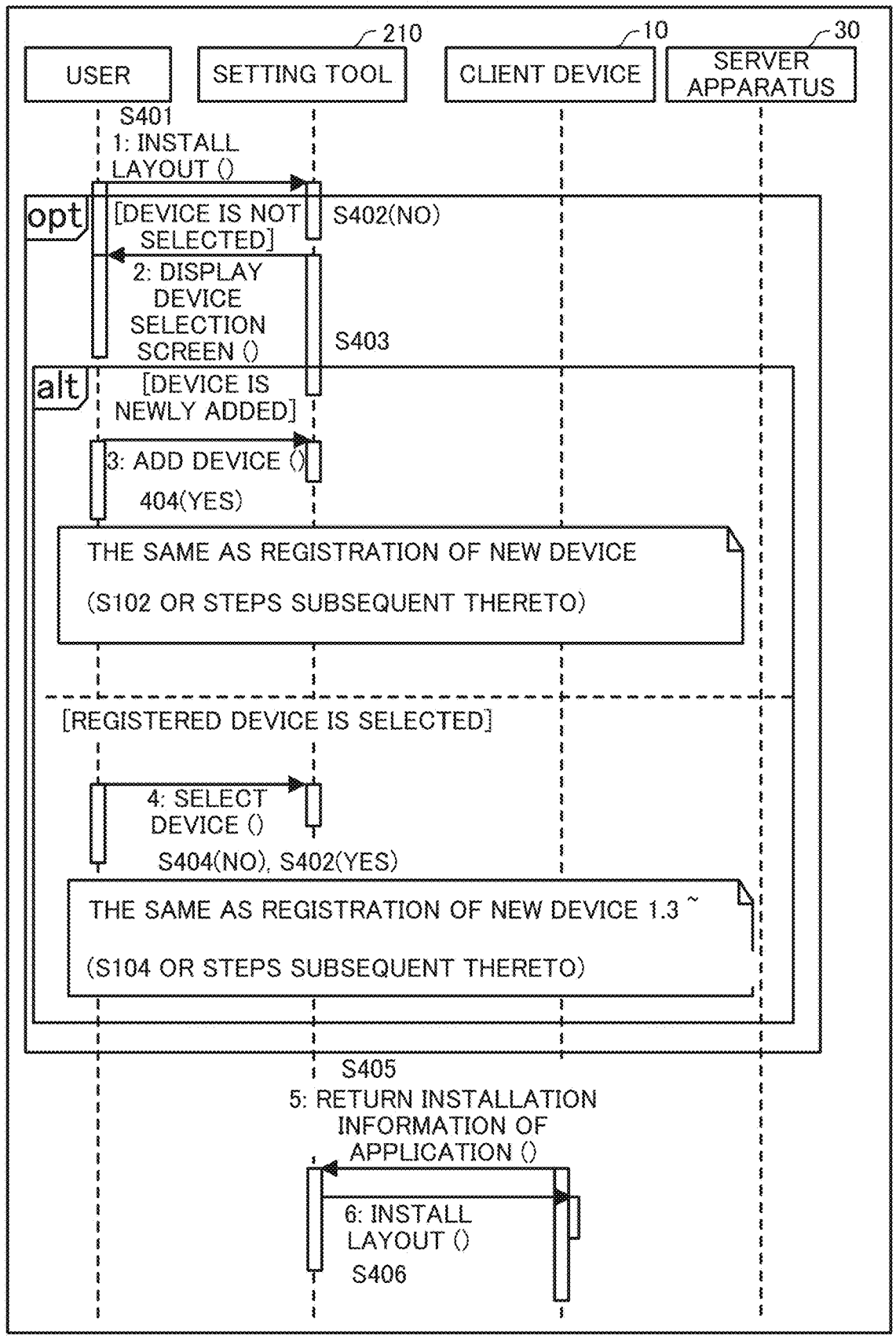
FIG. 11 is a diagram illustrating a fourth operation sequence of the information processing system.
Figure 12:
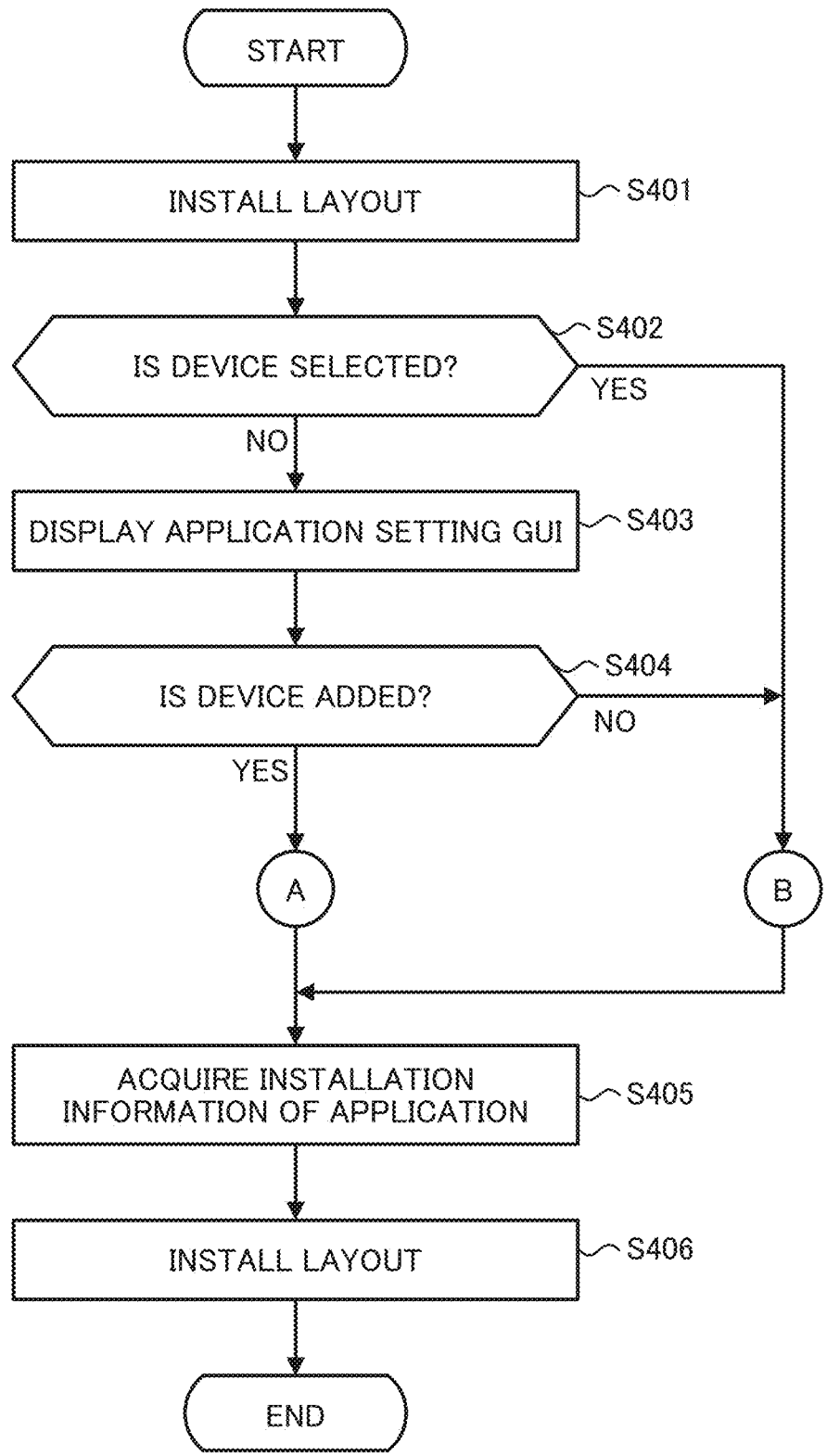
FIG. 12 is a diagram illustrating a third operation flow of the setting tool.
Figure 13:
FIG. 13 is a diagram illustrating an example of a layout.

FIG. 11 illustrates a fourth operation sequence of the information processing system. FIG. 12 illustrates a third operation flow of the setting tool. FIG. 13 illustrates an example of a layout.

In order to install a layout of a graphical user interface of the application 110 in the client device 10, the user operates a GUI (for example, the application setting GUI 400 or another GUI) displayed on the display device 250 (display) of the information processing apparatus 20.

As illustrated in FIG. 13, the layout of the graphical user interface of the application 110 means a GUI group in which icons for performing the functions of the application 110 are arranged in a tile shape.

When a request for installing the layout in a client device 10 is received from the user via the touch panel (Step S401), the layout installer 223 of the application setter 220 of the setting tool 210 determines whether a client device 10 in which the layout is to be installed has been selected (Step S402).

When a client device 10 in which the layout is to be installed has not been selected on the application setting GUI 400 (NO in Step S402), the layout installer 223 displays the application setting GUI 400 on the display device 250 (display) of the information processing apparatus 20 to enable adding (YES in Step S404) or selecting (NO in Step S404) of a client device 10 (Step S403).

It is also assumed that the user wants to install the layout in a new client device 10 which is not displayed in the device list 410 of the application setting GUI 400 (that is not registered in the setting tool 210). In this case, the user operates the discover-device icon 401 of the application setting GUI 400 to register the new client device 10 in the setting tool 210.

When an operation of the discover-device icon 401 is detected (YES in Step S404), the device register 221 of the application setter 220 of the setting tool 210 performs operations of Step S102 and steps subsequent thereto. As a result, the new client device 10 is registered in the server apparatus 30 (Step S107 or S108).

It is also assumed that the user wants to install the layout in a client device 10 displayed in the device list 410 of the application setting GUI 400 (that is, registered in the setting tool 210). In this case, by operating the check box 419 of the application setting GUI 400, the user selects a client device 10 in which the layout is to be installed on the application setting GUI 400 via the touch panel (NO in Step S404). Alternatively, when a client device 10 in which the layout is to be installed has been selected (YES in Step S402) at a time point at which the user has input the operation for installing the layout in the client device 10 (Step S401), the client device 10 in which the layout is to be installed has been registered in the setting tool 210.

In this case, the server synchronizer 230 of the setting tool 210 starts an operation for synchronously registering the client device 10 in the server apparatus 30 (after Step S104). As a result, the new client device 10 is registered in the server apparatus 30 (Step S107 or Step S108).

Here, the client device 10 transmits installation information to the setting tool 210 in response to an installation information reference request from the setting tool 210. Alternatively, when the installation information reference request is received from the server apparatus 30 (Step S202), the client device 10 transmits installation information to the server apparatus 30 and the setting tool 210. When the application 110 is installed (Step S204), the client device 10 may transmit the installation information to the setting tool 210.

The application setter 220 of the setting tool 210 acquires the installation information of the application 110 from the client device 10 (Step S405). The layout installer 223 of the application setter 220 of the setting tool 210 installs the layout in the client device 10 (Step S406).

In this way, the setting tool 210 can register a client device 10 in which a layout is to be newly installed in the setting tool 210 and synchronously register the client device 10 in the server apparatus 30 with reception of a request for newly installing the layout of the application 110 in the client device 10 as a trigger.

4. Conclusion

A function of an application installed in a client device may be provided via a network, not via a local area of the client device. In this case, the client device to which the function is to be provided needs to be registered in the server apparatus that provides the function.

In general, the setting tool and the server apparatus do not share device information of client devices. Accordingly, a user needs to manually register the client devices in the setting tool and the server apparatus.

On the other hand, according to this embodiment, the setting tool 210 synchronously registers a client device 10 in the server apparatus 30 with setting in the client device 10 as a trigger. For example, the setting tool 210 synchronously registers in the server apparatus 30 with registration of the client device 10 in the setting tool 210 (Step S103) as a trigger (Steps S104 to S108). Accordingly, by allowing the user to perform one step of action of registering the client device 10 in the setting tool 210 (Step S103), the same client device 10 is synchronously registered in the server apparatus 30 in the back ground. Accordingly, it is possible to reduce the number of operation steps performed by a user, it is not necessary to redundantly register a client device 10, and it is possible to reduce opportunities for a user to mistake an input. As a result, according to the present disclosure, it is possible to achieve appropriate and user-friendly registration of a client device 10 in the server apparatus 30.

According to the embodiment, when the setting tool 210 synchronously registers a client device 10 in the server apparatus 30 (Step S201), the server apparatus 30 installs an application 110 of a newest version in the synchronously registered client device 10 (Step S204). Accordingly, the application 110 of a newest version is installed with setting for the client device 10 registered in the setting tool 210 as a trigger. As a result, it is possible to install an application 110 of a newest version in a client device 10 without requiring a user's action.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
a control circuit configured to operate as a setting tool that performs setting of an application installed in a client device by executing a setting tool program;
a display device includes a touch panel; and
a storage device registers device information of a client device,
wherein the setting tool includes:
an application setter configured to perform setting of an application in a client device; and
a server synchronizer configured to synchronously register the client device on which setting has been performed by the application setter in a server apparatus that manages a client device which is provided with a function of the application with the setting performed on the client device by the application setter as a trigger,
wherein, the application setter is configured to:
cause the display device to display a device list indicating device information of a registered client device, a first icon to register a new client device, and a second icon to update the device list,
detect, when an operation of a user on the first icon is detected through the touch panel, the new client device new connected to the information processing apparatus via a network and registers device information of the new client device in the storage device, and
add, when an operation of a user on the second icon is detected through the touch panel, the device information of the new client device to the device list,
the server synchronizer is configured to synchronously register the new client device in the server apparatus with registration of the new client device to the storage device by the application setter as a trigger.

2. The information processing apparatus according to claim 1,
wherein, when the number of licenses of the client devices provided with the function of the application reaches an upper limit and the new client device is not registered in the server apparatus or is not activated, the server synchronizer is configured to:
provide a device editing user interface for editing device information of client devices which are registered in the server apparatus and activated;
delete device information of one client device to reduce the number of licenses less than the upper limit by editing the device information of the client devices registered in the server apparatus and activated using the device editing user interface; and
synchronously register the new client device in the server apparatus by adding the new client device to the server apparatus.

3. The information processing apparatus according to claim 1,
wherein, when the number of licenses of the client devices provided with the function of the application has not reached an upper limit and the new client device is not registered in the server apparatus or is not activated, the server synchronizer is configured to synchronously register the new client device in the server apparatus by adding the new client device to the server apparatus.

4. The information processing apparatus according to claim 1,
wherein, when the new client device is registered in the server apparatus and is activated regardless of whether the number of licenses of the client devices provided with the function of the application has reached an upper limit, the server synchronizer is configured to additionally synchronously register the new client device in the server apparatus as a selected new client device by selecting the new client device registered in the server apparatus.

5. The information processing apparatus according to claim 1,
wherein the application setter includes an application installation request receiver configured to receive a request for installing the application in a client device, and
wherein the server synchronizer is configured to synchronously register a client device in which the application is newly installed in the server apparatus with reception of the request for newly installing the application in the client device by the application installation request receiver as a trigger.

6. The information processing apparatus according to claim 1,
wherein the application setter includes a layout installer configured to install a layout of a graphical user interface of the application in a client device, and
wherein the server synchronizer is configured to synchronously register a client device in which the layout is newly installed in the server apparatus with reception of a request for newly installing the layout in the client device by the layout installer as a trigger.

7. An information processing system comprising an information processing apparatus and a server apparatus,
wherein the information processing apparatus includes:
a control circuit configured to operate as a setting tool that performs setting of an application installed in a client device by executing a setting tool program;
a display device includes a touch panel; and
a storage device registers device information of a client device,
wherein the setting tool includes:
an application setter configured to perform setting of an application in a client device; and
a server synchronizer configured to synchronously register the client device on which setting has been performed by the application setter in the server apparatus that manages a client device which is provided with a function of the application with the setting performed on the client device by the application setter as a trigger,
wherein, the application setter is configured to:
cause the display device to display a device list indicating device information of a registered client device, a first icon to register a new client device, and a second icon to update the device list,
detect, when an operation of a user on the first icon is detected through the touch panel, the new client device new connected to the information processing apparatus via a network and registers device information of the new client device in the storage device, and add, when an operation of a user on the second icon is detected through the touch panel, the device information of the new client device to the device list, the server synchronizer is configured to synchronously register the new client device in the server apparatus with registration of the new client device to the storage device by the application setter as a trigger.

8. The information processing system according to claim 7, wherein the server apparatus installs the application in the new client device synchronously registered when the application is not installed in the new client device synchronously registered.

9. The information processing system according to claim 8, wherein the server apparatus installs a newest version of the application in the new client device synchronously registered when the application is installed in the new client device synchronously registered and a version of the installed application is older than a newest version.

10. A non-transitory computer-readable recording medium storing a setting tool program, the setting tool program causing a control circuit of an information processing apparatus, which i including a display device includes a touch panel and a storage device registers device information of a client device, to operate as a setting tool, wherein the setting tool operates as:

an application setter configured to perform setting of an application in a client device; and a server synchronizer configured to synchronously register the client device on which setting has been performed by the application setter in a server apparatus that manages a client device which is provided with a function of the application with the setting performed on the client device by the application setter as a trigger, wherein, the application setter is configured to:

cause the display device to display a device list indicating device information of a registered client device, a first icon to register a new client device, and a second icon to update the device list, detect, when an operation of a user on the first icon is detected through the touch panel, the new client device new connected to the information processing apparatus via a network and registers device information of the new client device in the storage device, and add, when an operation of a user on the second icon is detected through the touch panel, the device information of the new client device to the device list, the server synchronizer is configured to synchronously register the new client device in the server apparatus with registration of the new client device to the storage device by the application setter as a trigger.

\* \* \* \* \*